(12) United States Patent
Lu et al.

(10) Patent No.: US 11,543,260 B2
(45) Date of Patent: Jan. 3, 2023

(54) PLOTTING METHOD FOR THREE-DIMENSIONAL TIME-SPACE DIAGRAM SHOWING REGIONAL GREEN-WAVE COORDINATED CONTROL EFFECT

(71) Applicant: SOUTH CHINA UNIVERSITY OF TECHNOLOGY, Guangdong (CN)

(72) Inventors: Kai Lu, Guangdong (CN); Xin Tian, Guangdong (CN); Shuyan Jiang, Guangdong (CN); Li Wang, Guangdong (CN); Jianxun Xu, Guangdong (CN)

(73) Assignee: SOUTH CHINA UNIVERSITY OF TECHNOLOGY, Guangzhou (CN)

( * ) Notice: Subject to any disclaimer, the term of this patent is extended or adjusted under 35 U.S.C. 154(b) by 149 days.

(21) Appl. No.: 17/042,950

(22) PCT Filed: Oct. 31, 2019

(86) PCT No.: PCT/CN2019/114909
§ 371 (c)(1),
(2) Date: Sep. 29, 2020

(87) PCT Pub. No.: WO2020/134561
PCT Pub. Date: Jul. 2, 2020

(65) Prior Publication Data
US 2021/0033418 A1 Feb. 4, 2021

(30) Foreign Application Priority Data
Dec. 25, 2018 (CN) .......................... 201811593233.1

(51) Int. Cl.
*G01C 21/36* (2006.01)

(52) U.S. Cl.
CPC ....... *G01C 21/367* (2013.01); *G01C 21/3614* (2013.01); *G01C 21/3676* (2013.01)

(58) Field of Classification Search
CPC .............. G01C 21/367; G01C 21/3614; G01C 21/3676; G08G 1/081
See application file for complete search history.

(56) References Cited

U.S. PATENT DOCUMENTS

| 7,565,155 B2 | 7/2009 | Sheha et al. |
| 2005/0197767 A1 | 9/2005 | Nortrup |

FOREIGN PATENT DOCUMENTS

| CN | 102831776 | 12/2012 |
| CN | 103544840 | 1/2014 |

(Continued)

OTHER PUBLICATIONS

"International Search Report (Form PCT/ISA/210) of PCT/CN2019/114909", dated Feb. 1, 2019, with English translation thereof, pp. 1-6.

*Primary Examiner* — Rami Khatib
(74) *Attorney, Agent, or Firm* — JCIPRNET

(57) ABSTRACT

The invention discloses a plotting method for a three-dimensional time-space diagram showing a regional green-wave coordinated control effect. The plotting method includes the following steps: establishing a coordinate system of the three-dimensional time-space diagram; determining a specific position coordinate of each intersection in the coordinate system of the three-dimensional time-space diagram; generating a time prism of a signal timing plan of each intersection; determining a green-wave bandwidth of each arterial road; and generating a driving trajectory between the intersections, and making a green-wave band of each arterial road, and completing plotting.

8 Claims, 11 Drawing Sheets

(56) References Cited

FOREIGN PATENT DOCUMENTS

| | | | |
|---|---|---|---|
| CN | 106097736 | 11/2016 | |
| CN | 109493621 | 3/2019 | |
| WO | WO-2018149308 A1 * | 8/2018 | ............... G08G 1/01 |

* cited by examiner

Green time of phase of each intersection

| Intersection | Green time /s | | | | Signal phase sequence |
|---|---|---|---|---|---|
| | East entrance | South entrance | West entrance | North entrance | |
| $I_1$ | 20 | 20 | 20 | 30 | West, east, north and south |
| $I_2$ | 22 | 22 | 20 | 26 | North, south, west and east |
| $I_3$ | 22 | 20 | 22 | 26 | West, east, north and south |
| $I_4$ | 20 | 20 | 30 | 20 | West, north, east and south |
| $I_5$ | 20 | 20 | 28 | 22 | West, north, east and south |
| $I_6$ | 20 | 20 | 28 | 22 | West, north, east and south |
| $I_7$ | 20 | 30 | 20 | 20 | West, north, east and south |
| $I_8$ | 20 | 20 | 22 | 28 | West, north, east and south |
| $I_9$ | 20 | 20 | 20 | 30 | South, west, north and east |

FIG. 2

Green starting point and green ending point of phase of each intersection

| Intersection | Green starting point | | | | Green ending point | | | |
|---|---|---|---|---|---|---|---|---|
| | East entrance | South entrance | West entrance | North entrance | East entrance | South entrance | West entrance | North entrance |
| $I_1$ | 84 | 134 | 64 | 104 | 104 | 154 | 84 | 134 |
| $I_2$ | 128 | 86 | 108 | 60 | 150 | 108 | 128 | 86 |
| $I_3$ | 84 | 132 | 62 | 106 | 106 | 152 | 84 | 132 |
| $I_4$ | 76 | 96 | 26 | 56 | 96 | 116 | 56 | 76 |
| $I_5$ | 121 | 141 | 71 | 99 | 141 | 161 | 99 | 121 |
| $I_6$ | 76 | 96 | 26 | 54 | 96 | 116 | 54 | 76 |
| $I_7$ | 30 | 50 | -10 | 10 | 50 | 80 | 10 | 30 |
| $I_8$ | 78 | 98 | 29 | 50 | 98 | 118 | 51 | 78 |
| $I_9$ | 123 | 53 | 73 | 93 | 143 | 73 | 93 | 123 |

FIG. 3

Three-dimensional coordinate of green starting point of phase of each intersection

| Intersection | North entrance | East entrance | South entrance | West entrance |
|---|---|---|---|---|
| $I_1$ | (0,0,84) | (0,0,134) | (0,0,64) | (0,0,104) |
| $I_2$ | (560, 0,128) | (560, 0,86) | (560, 0,108) | (560, 0,60) |
| $I_3$ | (1170,0,84) | (1170,0,132) | (1170,0,62) | (1170,0,106) |
| $I_4$ | (0,540,76) | (0,540,96) | (0,540,26) | (0,540,56) |
| $I_5$ | (580,550,121) | (580,550,141) | (580,550,71) | (580,550,99) |
| $I_6$ | (1180,530,76) | (1180,530,96) | (1180,530,26) | (1180,530,54) |
| $I_7$ | (0,1110,30) | (0,1110,50) | (0,1110,-10) | (0,1110,10) |
| $I_8$ | (560,1160,78) | (560,1160,98) | (560,1160,29) | (560,1160,50) |
| $I_9$ | (1160,1110,123) | (1160,1110,53) | (1160,1110,73) | (1160,1110,93) |

FIG. 5

Three-dimensional coordinate of green ending point of phase of each intersection

| Intersection | North entrance | East entrance | South entrance | West entrance |
|---|---|---|---|---|
| $I_1$ | (0,0,104) | (0,0,154) | (0,0,84) | (0,0,134) |
| $I_2$ | (560, 0,150) | (560, 0,108) | (560, 0,128) | (560, 0,86) |
| $I_3$ | (1170,0,106) | (1170,0,152) | (1170,0,84) | (1170,0,132) |
| $I_4$ | (0,540,96) | (0,540,116) | (0,540,56) | (0,540,76) |
| $I_5$ | (580,550,141) | (580,550,161) | (580,550,99) | (580,550,121) |
| $I_6$ | 1180,530,96) | (1180,530,116) | (1180,530,54) | (1180,530,76) |
| $I_7$ | (0,1110,50) | (0,1110,80) | (0,1110,10) | (0,1110,30) |
| $I_8$ | (560,1160,98) | (560,1160,118) | (560,1160,51) | (560,1160,78) |
| $I_9$ | (1160,1110,143) | (1160,1110,73) | (1160,1110,93 | (1160,1110,123) |

FIG. 6

| Bidirectional green-wave bandwidth of each arterial road/s | | | | | |
|---|---|---|---|---|---|
| Coordinated route | Inbound direction (from north to south) | Outbound direction (from south to north) | Coordinated route | Inbound direction (from west to east) | Outbound direction (from east to west) |
| $R_1$ | 19 | 17 | $R_4$ | 16 | 16 |
| $R_2$ | 17 | 22 | $R_5$ | 14 | 24 |
| $R_3$ | 18 | 22 | $R_6$ | 16 | 20 |

FIG. 8

Three-dimensional coordinate of green-wave band starting point in each entrance direction of each intersection

| Intersection | East entrance | South entrance | West entrance | North entrance |
| --- | --- | --- | --- | --- |
| $I_1$ | (0,0,174) | (0,0,135) | (0,0,68) | (0,0,21) |
| $I_2$ | (560,0,134) | (560,0,181) | (560,0,108) | (560,0,60) |
| $I_3$ | (1170,0,90) | (1170,0,134) | (1170,0,152) | (1170,0,16) |
| $I_4$ | (0,540,166) | (0,540,96) | (0,540,32) | (0,540,59) |
| $I_5$ | (580,550,125) | (580,550,142) | (580,550,73) | (580,550,99) |
| $I_6$ | (1180,530,82) | (1180,530,96) | (1180,530,116) | (1180,530,54) |
| $I_7$ | (0,1110,120) | (0,1110,55) | (0,1110,80) | (0,1110,100) |
| $I_8$ | (560,1160,80) | (560,1160,98) | (560,1160,120) | (560,1160,143) |
| $I_9$ | (1160,1110,37) | (1160,1110,55) | (1160,1110,163) | (1160,1110,95) |

FIG. 9

Three-dimensional coordinate of green-wave band ending point in each entrance direction of each intersection

| Intersection | East entrance | South entrance | West entrance | North entrance |
|---|---|---|---|---|
| $I_1$ | (0,0,190) | (0,0,154) | (0,0,84) | (0,0,37) |
| $I_2$ | (560,0,150) | (560,0,198) | (560,0,124) | (560,0,82) |
| $I_3$ | (1170,0,106) | (1170,0,152) | (1170,0,168) | (1170,0,38) |
| $I_4$ | (0,540,180) | (0,540,115) | (0,540,56) | (0,540,76) |
| $I_5$ | (580,550,139) | (580,550,159) | (580,550,97) | (580,550,121) |
| $I_6$ | (1180,530,96) | (1180,530,114) | (1180,530,140) | (1180,530,76) |
| $I_7$ | (0,1110,136) | (0,1110,75) | (0,1110,100) | (0,1110,117) |
| $I_8$ | (560,1160,96) | (560,1160,115) | (560,1160,140) | (560,1160,165) |
| $I_9$ | (1160,1110,53) | (1160,1110,73) | (1160,1110,183) | (1160,1110,117) |

FIG. 10

PLOTTING METHOD FOR THREE-DIMENSIONAL TIME-SPACE DIAGRAM SHOWING REGIONAL GREEN-WAVE COORDINATED CONTROL EFFECT

CROSS-REFERENCE TO RELATED APPLICATION

This application is a 371 of international application of PCT application serial no. PCT/CN2019/114909, filed on Oct. 31, 2019, which claims the priority benefit of China application no. 201811593233.1, filed on Dec. 25, 2018. The entirety of each of the above mentioned patent applications is hereby incorporated by reference herein and made a part of this specification.

BACKGROUND

Technical Field

The present invention relates to the field of traffic signal control technologies, and more particularly, to a plotting method for a three-dimensional time-space diagram showing a regional green-wave coordinated control effect.

Description of Related Art

In the design of green-wave coordinated control, traffic flows in a coordinated direction will be allowed to continuously pass through multiple downstream signalized intersections as much as possible, thus effectively reducing an average delay time and parking times of a target traffic flow, improving a driving smoothness of the traffic flow and reducing traffic accidents at intersections. This design is a preferred control method for an urban traffic control system under an unsaturated traffic condition, and relevant research results have been widely applied in many cities in China.

At present, an implementation effect of a green-wave coordinated control plan is mainly measured by using a time and distance diagram (a time-space diagram for short) to show a size of a green wave bandwidth of each coordinated route. The time-space diagram is a plan that shows a relationship between a coordinated intersection distance and signal timing, reflects movements of the traffic flows under coordinated control, and plays an important role in the green-wave coordinated control design for arterial roads. However, technical methods for regional traffic signal coordinated control have received more and more attention of designers with the development of urban traffic systems, and it is necessary to establish a performance mode capable of showing advantages and disadvantages of a regional traffic signal coordinated control effect.

For this reason, the present invention will provide a plotting method for a three-dimensional time-space diagram showing a regional green-wave coordinated control effect, which will comprehensively show an overall green-wave coordinated control effect of a regional traffic signal coordinated control plan by plotting the three-dimensional time-space diagram.

SUMMARY

In order to facilitate comprehensively showing the advantages and disadvantages of a regional traffic signal coordinated control effect, and facilitate observing entire regional traffic signal coordination, the present invention provides a plotting method for a three-dimensional time-space diagram showing a regional green-wave coordinated control effect, which is able to comprehensively show an overall green-wave coordinated control effect of a regional traffic signal coordinated control plan, and facilitates observing the traffic signal coordinated control for the entire region.

In order to achieve the above objective of the present invention, the following technical solution is employed: a plotting method for a three-dimensional time-space diagram showing a regional green-wave coordinated control effect includes the following steps:

S1: selecting an intersection in an area as a benchmark intersection, establishing a coordinate system of the three-dimensional time-space diagram, and determining a position of the benchmark intersection in the coordinate system of the three-dimensional time-space diagram;

S2: determining a specific position coordinate of each intersection in the coordinate system of the three-dimensional time-space diagram according to a position of each intersection relative to the benchmark intersection in the area;

S3: calculating a green starting point, a green center point and a green ending point of each signal phase of the intersection, and generating a time prism of a signal timing plan of each intersection in combination with a prism enclosed by cross sections of stop lines at each entrance of the intersection, wherein the time prism of the signal timing plan is a carrier reflecting the signal timing plan, each surface of the prism respectively represents each entrance direction of the intersection, and a height of a color block filled in each surface represents a phase duration of a coordinated phase in the entrance direction, which will play a fundamental role in plotting the entire time-space diagram;

S4: calculating a green-wave bandwidth from a $1^{st}$ intersection $I_{(i,1)}$ to an $n^{th}$ intersection $I_{(i,n)}$ of a coordinated route i; and completing positioning of a green-wave band in an upbound direction of the coordinated route i;

S5: calculating a green-wave bandwidth from the $n^{th}$ intersection $I_{(i,n)}$ to the $1^{st}$ intersection $I_{(i,1)}$ of the coordinated route i; and completing positioning of a green-wave band in a downbound direction of the coordinated route i;

S6: calculating a green-wave band starting point $T_{BS(i,j)}^{U}$ and a green-wave band ending point $T_{BE(i,j)}^{U}$ of the upbound green-wave band of the coordinated route i at a $j^{th}$ intersection $I_{(i,j)}$; and connecting the starting point of the upbound green-wave band of each intersection to obtain a starting trajectory of the upbound green-wave band of the coordinated route i, connecting the ending point of the upbound green-wave band of each intersection to obtain an ending trajectory of the upbound green-wave band of the coordinated route i, and obtaining the upbound green-wave band of the coordinated route i after determining the starting trajectory of the upbound green-wave band and the ending trajectory of the upbound green-wave band; and S7: calculating a green-wave band starting point $T_{BS(i,j)}^{D}$ and a green-wave band ending point $T_{BE(i,j)}^{D}$ of the downbound green-wave band of the coordinated route i at the $j^{th}$ intersection $I_{(i,j)}$; and connecting the starting point of the downbound green-wave band of each intersection to obtain a starting trajectory of the downbound green-wave band of the coordinated route i, connecting the ending point of the downbound green-wave band of each intersection to obtain an ending trajectory of the downbound green-wave band of the coordinated route i, obtaining the downbound green-wave band of the coordinated route i after determining the starting trajectory of the downbound green-wave band and the ending trajectory of the outbound green-wave band, and completing plotting.

Preferably, in the step S1, the benchmark intersection is used as an origin, and a forward direction of an X-axis from west to east, a forward direction of a Y-axis from north to south, and a Z-axis of time are selected to establish the coordinate system of the three-dimensional time-space diagram.

Preferably, the step S3 of calculating the green starting point, the green center point and the green ending point of each signal phase of the intersection is implemented by the following formulas:

$$T_{GS(i,j)}{}^k + \tfrac{1}{2} t_{G(i,j)}{}^k = T_{GM(i,j)}{}^k$$

$$T_{GM(i,j)}{}^k + \tfrac{1}{2} t_{G(i,j)}{}^k = T_{GE(i,j)}{}^k$$

wherein: i represents a serial number of a route to be coordinated where the intersection is located; j represents a serial number of the intersection on the route to be coordinated, and defines a direction of the serial numbers of the intersections from small to large as the upbound direction of the coordinated route, and a direction of the serial numbers of the intersections from large to small as the downbound direction of the coordinated route; $T_{GS(i,j)}{}^k$, $T_{GM(i,j)}{}^k$ and $T_{GE(i,j)}{}^k$ respectively represent a green starting point, a green center point and a green ending point of a signal phase k of the intersection $I_{(i,j)}$; and $t_{G(i,j)}{}^k$ represents a green time of the signal phase k of the intersection $I_{(i,j)}$.

Further, the cross sections of the stop lines at each entrance of the intersection are enclosed into the prism, and the cross sections of the stop lines at each entrance correspond to side surfaces of the time prism of the signal timing plan of the intersection; and a corresponding green time period of a coordinated phase is marked with a designated color block on each side surface of the time prism of the signal timing plan of the intersection to form one time prism containing information of the signal timing plan of the intersection.

Preferably, the step S4 of determining the green-wave bandwidth in the inbound direction of the coordinated route i and positioning the green-wave band includes the following specific steps:

S401: calculating a green-wave bandwidth from the 1$^{st}$ intersection $I_{(i,1)}$ to a 2$^{nd}$ intersection $I_{(i,2)}$ in the upbound direction of the coordinated route i by the following formulas:

$$T_{S(i,2)}^U = \max\left\{T_{GS(i,1)}^U + \frac{L_{(i,1\to 2)}}{v_{(i,1\to 2)}}, T_{GS(i,2)}^U\right\}$$

$$T_{E(i,2)}^U = \min\left\{T_{GE(i,1)}^U + \frac{L_{(i,1\to 2)}}{v_{(i,1\to 2)}}, T_{GE(i,2)}^U\right\}$$

$$B_{(i,1\to 2)} = T_{E(i,2)}^U - T_{S(i,2)}^U$$

wherein: $T_{S(i,2)}{}^U$ and $T_{E(i,2)}{}^U$ respectively represent a starting point and an ending point of a green-wave band from the 1$^{st}$ intersection $I_{(i,1)}$ to the 2$^{nd}$ intersection $I_{(i,2)}$ in the upbound direction of the coordinated route i at a signal phase U of the intersection $I_{(i,2)}$; $T_{GS(i,1)}{}^U$ and $T_{GE(i,1)}{}^U$ represent a green starting point and a green ending point of a signal phase U of the intersection $I_{(i,1)}$; $T_{GS(i,2)}{}^U$ and $T_{GE(i,2)}{}^U$ represent a green starting point and a green ending point of the signal phase U of the intersection $I_{(i,2)}$; $L_{(i,1\to 2)}$ represents a distance from the intersection $I_{(i,1)}$ to the intersection $I_{(i,2)}$; $v_{(i,1\to 2)}$ represents a driving speed from the intersection $I_{(i,1)}$ to the intersection $I_{(i,2)}$; and $B_{(i,1\to 2)}$ represents the green-wave bandwidth from the 1$^{st}$ intersection $I_{(i,1)}$ to the 2$^{nd}$ intersection $I_{(i,2)}$ of the coordinated route i;

S402: calculating a green-wave bandwidth from the 1$^{st}$ intersection $I_{(i,1)}$ to the j$^{th}$ intersection $I_{(i,j)}$ in the upbound direction of the coordinated route i by the following formulas:

$$T_{S(i,j)}^U = \max\left\{T_{S(i,j-1)}^U + \frac{L_{(i,j-1\to j)}}{v_{(i,j-1\to j)}}, T_{GS(i,j)}^U\right\}$$

$$T_{E(i,j)}^U = \min\left\{T_{E(i,j-1)}^U + \frac{L_{(i,j-1\to j)}}{v_{(i,j-1\to j)}}, T_{GE(i,j)}^U\right\}$$

$$B_{(i,1\to j)} = T_{E(i,j)}^U - T_{S(i,j)}^U$$

wherein: $T_{S(i,j)}{}^U$ and $T_{E(i,j)}{}^U$ respectively represent a starting point and an ending point of a green-wave band from the 1$^{st}$ intersection $I_{(i,1)}$ to the j$^{th}$ intersection $I_{(i,j)}$ in the upbound direction of the coordinated route i at a signal phase U of the intersection $I_{(i,j)}$; $T_{GS(i,j)}{}^U$ and $T_{GE(i,j)}{}^U$ represent a green starting point and a green ending point of the signal phase U of the intersection $I_{(i,j)}$; $L_{(i,j-1\to j)}$ represents a distance from an intersection $I_{(i,j-1)}$ to the intersection $I_{(i,j)}$; $v_{(i,j-1\to j)}$ represents a driving speed from the intersection $I_{(i,j-1)}$ to the intersection $I_{(i,j)}$; and $B_{(i,1\to j)}$ represents the green-wave bandwidth from the 1$^{st}$ intersection $I_{(i,j)}$ to the j$^{th}$ intersection $I_{(i,j)}$ of the coordinated route i; and S403: obtaining a green-wave bandwidth $B_{(i,1\to n)} = T_{E(i,n)}{}^U - T_{S(i,n)}{}^U$ from the 1$^{st}$ intersection $I_{(i,j)}$ to a last intersection $I_{(i,n)}$ in the upbound direction of the coordinated route i, and completing positioning of the green-wave band in the upbound direction according to a starting point $T_{S(i,n)}{}^U$ and an ending point $T_{E(i,n)}{}^U$ of the green-wave band at a signal phase U of the intersection $I_{(i,n)}$.

Preferably, the step S 5 of determining the green-wave bandwidth in the outbound direction of the coordinated route i and positioning the green-wave band includes the following specific steps:

S501: calculating a green-wave bandwidth from the 1$^{st}$ intersection $I_{(i,n)}$ to a 2$^{nd}$ intersection $I_{(i,n-1)}$ in the downbound direction of the coordinated route i by the following formulas:

$$T_{S(i,n-1)}^D = \max\left\{T_{GS(i,n)}^D + \frac{L_{(i,n\to n-1)}}{v_{(i,n\to n-1)}}, T_{GS(i,n-1)}^D\right\}$$

$$T_{E(i,n-1)}^D = \min\left\{T_{GE(i,1)}^D + \frac{L_{(i,n\to n-1)}}{v_{(i,n\to n-1)}}, T_{GE(i,n-1)}^D\right\}$$

$$B_{(i,n\to n-1)} = T_{E(i,n-1)}^D - T_{S(i,n-1)}^D$$

wherein: $T_{S(i,n-1)}{}^D$ and $T_{E(i,n-1)}{}^D$ respectively represent a starting point and an ending point of a green-wave band from the 1$^{st}$ intersection $I_{(i,n)}$ to the 2$^{nd}$ intersection $I_{(i,n-1)}$ in the downbound direction of the coordinated route i at a signal phase D of the intersection $I_{(i,n-1)}$; $T_{GS(i,n)}{}^D$ and $T_{GE(i,n)}{}^D$ represent a green starting point and a green ending point of a signal phase D of the intersection $I_{(i,n)}$; $T_{GS(i,n-1)}{}^D$ and $T_{GE(i,n-1)}{}^D$ represent a green starting point and a green ending point of the signal phase D of the intersection $I_{(i,n-1)}$; $L_{(i,n\to n-1)}$ represents a distance from the intersection $I_{(i,n)}$ to the intersection $I_{(i,n-1)}$; $v_{(i,n\to n-1)}$ represents a driving speed from the intersection $I_{(i,n)}$ to the intersection $I_{(i,n-1)}$; and $B_{(i,n\to n-1)}$ represents the green-wave bandwidth from the 1$^{st}$ intersection $I_{(i,n)}$ to the 2$^{nd}$ intersection $I_{(i,n-1)}$ of the coordinated route i;

S502: calculating the green-wave bandwidth from the intersection $I_{(i,n)}$ to the intersection $I_{(i,j)}$ in the downbound direction of the coordinated route i by the following formulas:

$$T_{S(i,j)}^D = \max\left\{T_{S(i,j+1)}^D + \frac{L_{(i,j+1\to j)}}{v_{(i,j+1\to j)}}, T_{GS(i,j)}^D\right\}$$

$$T_{E(i,j)}^D = \min\left\{T_{E(i,j+1)}^D + \frac{L_{(i,j+1\to j)}}{v_{(i,j+1\to j)}}, T_{GE(i,j)}^D\right\}$$

$$B_{(i,n\to j)} = T_{E(i,j)}^D - T_{S(i,j)}^D$$

wherein: $T_{S(i,j)}^D$ and $T_{E(i,j)}^D$ respectively represent a starting point and an ending point of a green-wave band from the intersection $I_{(i,n)}$ to the intersection $I_{(i,j)}$ in the downbound direction of the coordinated route i at a signal phase D of the intersection $I_{(i,j)}$; $T_{GS(i,j)}^D$ and $T_{GE(i,j)}^D$ represent a green starting point and a green ending point of the signal phase D of the intersection $I_{(i,j)}$; $L_{(i,j+1\to j)}$ represents a distance from an intersection $I_{(i,j+1)}$ to the intersection $I_{(i,j)}$; $v_{(i,j+\to j)}$ represents a driving speed from the intersection $I_{(i,j+1)}$ to the intersection $I_{(i,j)}$; and $B_{(i,n\to j)}$ represents the green-wave bandwidth from the intersection $I_{(i,n)}$ to the intersection $I_{(i,j)}$ of the coordinated route i; and S503: obtaining a green-wave bandwidth $B_{(i,n\to 1)} = T_{E(i,1)}^D - T_{S(i,1)}^D$ from the $1^{st}$ intersection $I_{(i,n)}$ to a last intersection $I_{(i,1)}$ in the downbound direction of the coordinated route i, and completing positioning of the green-wave band in the downbound direction according to a starting point $T_{S(i,1)}^D$ and an ending point $T_{E(i,1)}^D$ of the green-wave band at a signal phase D of the intersection $I_{(i,1)}$.

Further, the green-wave band starting point $T_{BS(i,j)}^U$ and the green-wave band ending point $T_{BE(i,j)}^U$ of the upbound green-wave band of the coordinated route i at the intersection $I_{(i,j)}$ are calculated by the following formulas:

$$T_{BS(i,j)}^U = T_{S(i,n)}^U - \sum_{x=j+1}^{n} \frac{L_{(i,x-1\to x)}}{v_{(i,x-1\to x)}}$$

$$T_{BE(i,j)}^U = T_{E(i,n)}^U - \sum_{x=j+1}^{n} \frac{L_{(i,x-1\to x)}}{v_{(i,x-1\to x)}}$$

wherein: $1 \leq j < n$; $T_{BS(i,n)}^U = T_{S(i,n)}^U$; $T_{BE(i,n)}^U = T_{E(i,n)}^U$; and x represents a variable of the serial number of the intersection.

Further, the green-wave band starting point $T_{BS(i,j)}^D$ and the green-wave band ending point $T_{BE(i,j)}^D$ of the downbound green-wave band of the coordinated route i at the intersection $I_{(i,j)}$ are calculated by the following formulas:

$$T_{BS(i,j)}^D = T_{S(i,1)}^D - \sum_{x=2}^{j} \frac{L_{(i,x-1\to x)}}{v_{(i,x-1\to x)}}$$

$$T_{BE(i,j)}^D = T_{E(i,1)}^D - \sum_{x=2}^{j} \frac{L_{(i,x-1\to x)}}{v_{(i,x-1\to x)}}$$

wherein: $1 < j \leq n$; $T_{BS(i,1)}^D = T_{S(i,1)}^D$; $T_{BE(i,1)}^D = T_{E(i,1)}^D$; and x represents a variable of the serial number of the intersection.

The present invention has the beneficial effects as follow.

1) The present invention can reflect movement statuses of multiple coordinated traffic flows and comprehensively show the overall green-wave coordinated control effect of the regional traffic signal coordinated control plan.

2) The present invention realizes three-dimensional description of a time-space relationship among the intersections in the road network by establishing the time prism of the signal timing plan of each intersection, so that establishment of a road network coordinated control optimization model is facilitated.

3) The present invention obtains the upbound and downbound green wave bands of the coordinated route to form the completed coordinated route, thus showing an overall control effect on a coordinated path chain and a coordinated path set in the area, and realizing direct visualization of the road network traffic signal coordinated control effect.

BRIEF DESCRIPTION OF THE DRAWINGS

FIG. 2 is a statistical chart of a green time of a phase of each intersection according to the embodiment.

FIG. 3 is statistical chart of a green starting point and a green ending point of the phase of each intersection according to the embodiment.

FIG. 5 shows a three-dimensional coordinate of a green starting point of the phase of each intersection according to the embodiment.

FIG. 6 shows a three-dimensional coordinate of a green ending point of the phase of each intersection according to the embodiment.

FIG. 8 shows a result of a bidirectional green-wave bandwidth of each arterial road obtained by calculation according to the embodiment.

FIG. 9 shows a three-dimensional coordinate of a green-wave band starting point in each entrance direction of each intersection according to the embodiment.

FIG. 10 shows a three-dimensional coordinate of a green-wave band ending point in each entrance direction of each intersection according to the embodiment.

DESCRIPTION OF THE EMBODIMENTS

The present invention will be further described in detail hereinafter with reference to the accompanying drawings and specific embodiments.

Embodiment 1

Figure 1:
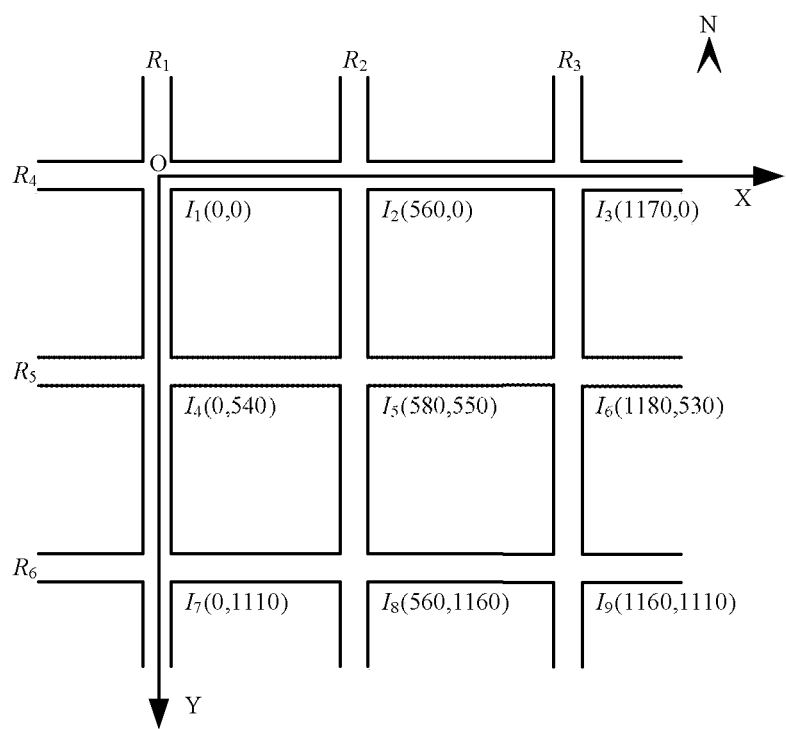
FIG. 1 is a diagram showing a structure of a road network and positions of intersections according to an embodiment of the present invention.

It is known that a structure of a road network and positions of intersections in a certain area are shown in FIG. 1, a public signal period is 90 seconds, and a way of separate release at an entrance is used in each intersection. A green time of a phase of each intersection is shown in FIG. 2, a green starting point and a green ending point of the phase of each intersection are shown in FIG. 3, and a green-wave design driving speed of each road section is 14 m/s.

Figure 4:
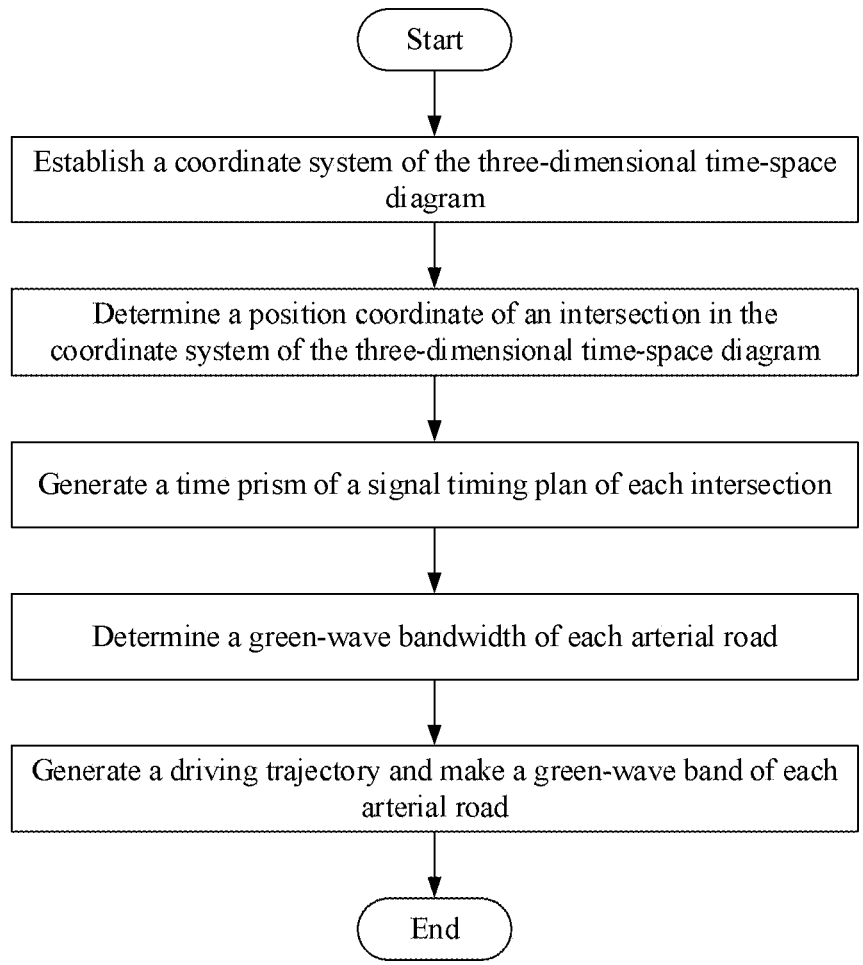
FIG. 4 is a step flow chart of the present invention.

As shown in FIG. 4, a plotting method for a three-dimensional time-space diagram showing a regional green-wave coordinated control effect includes the following steps.

In step S1, an intersection $I_1$ is selected as a regional benchmark intersection in the embodiment. The regional benchmark intersection is used as an origin, and a forward direction of an X-axis from west to east, a forward direction of a Y-axis from north to south, and a Z-axis of time are selected to establish a coordinate system of the three-dimensional time-space diagram.

In step S2, a specific position coordinate of each intersection in the coordinate system of the three-dimensional time-space diagram is determined according to a position of each intersection relative to the benchmark intersection in the area, as shown in FIG. 1.

In step S3, a green starting point, a green center point and a green ending point of each signal phase of the intersection are calculated, and a time prism of a signal timing plan of each intersection is generated in combination with a prism enclosed by cross sections of stop lines at each entrance of the intersection.

The green starting point, the green center point and the green ending point of each signal phase of the intersection are calculated by the following formulas:

$$T_{GS(i,j)}{}^{k}+\tfrac{1}{2}t_{G(i,j)}{}^{k}=T_{GM(i,j)}{}^{k}$$

$$T_{GM(i,j)}{}^{k}+\tfrac{1}{2}t_{G(i,j)}{}^{k}=T_{GE(i,j)}{}^{k}$$

wherein: i represents a serial number of a route to be coordinated where the intersection is located; j represents a serial number of the intersection on the route to be coordinated, and defines a direction of the serial numbers of the intersections from small to large as the upbound direction of the coordinated route, and a direction of the serial numbers of the intersections from large to small as the downbound direction of the coordinated route; $T_{GS(i,j)}{}^{k}$, $T_{GM(i,j)}{}^{k}$ and $T_{GE(i,j)}{}^{k}$ respectively represent a green starting point, a green center point and a green ending point of a signal phase k of the intersection $I_{(i,j)}$; and $t_{G(i,j)}{}^{k}$ represents a green time of the signal phase k of the intersection $I_{(i,j)}$.

Each intersection in the area needs to be further defined according to the coordinated route where the intersection is located and a serial number of a position of the intersection. For example, intersections $I_1$, $I_4$ and $I_7$ on a south-north coordinated route $R_1$ may be further defined as intersections $I_{(1,1)}$, $I_{(1,2)}$ and $I_{(1,3)}$, intersections $I_2$, $I_5$ and $I_8$ on a south-north coordinated route $R_2$ may be further defined as intersections $I_{(2,1)}$, $I_{(2,2)}$ and $I_{(2,3)}$, intersections $I_3$, $I_6$ and $I_9$ on a south-north coordinated route $R_3$ may be further defined as intersections $I_{(3,1)}$, $I_{(3,2)}$ and $I_{(3,3)}$, intersections $I_1$, $I_2$ and $I_3$ on an east-west coordinated route $R_4$ may be further defined as intersections $I_{(4,1)}$, $I_{(4,2)}$ and $I_{(4,3)}$, intersections $I_4$, $I_5$ and $I_6$ on an east-west coordinated route $R_5$ may be further defined as intersections $I_{(5,1)}$, $I_{(5,2)}$ and $I_{(5,3)}$, and intersections $I_7$, $I_8$ and $I_9$ on an east-west coordinated route $R_6$ may be further defined as intersections $I_{(6,1)}$, $I_{(6,2)}$ and $I_{(6,3)}$.

In the embodiment, the cross sections of the stop lines at each entrance of the intersection are enclosed into the prism, and the cross sections of the stop lines at each entrance correspond to side surfaces of the time prism of the signal timing plan of the intersection. A corresponding green time period of a coordinated phase is marked with a designated color block on each side surface of the time prism of the signal timing plan of the intersection to form one time prism containing information of the signal timing plan of the intersection.

Figure 7:
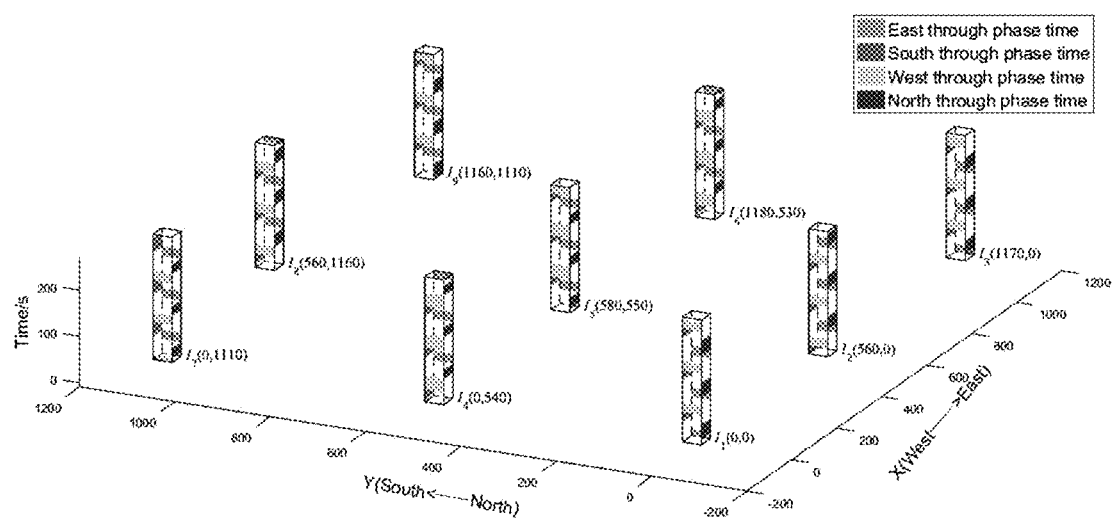
FIG. 7 shows a time prism of a signal timing plan according to the embodiment.

The three-dimensional coordinates of the green starting and ending points of the phase of each intersection are determined according to the specific position coordinate of each intersection in the coordinate system of the three-dimensional time-space diagram and the green starting point and the green ending point of the phase of each intersection shown in FIG. 3, as shown in FIG. 5 and FIG. 6 respectively. According to the step S3, the established time prism of the signal timing plan of each intersection is shown in FIG. 7. The time prism of the signal timing plan is a carrier reflecting the signal timing plan, each surface of the prism respectively represents each entrance direction of the intersection, and a height of a color block filled in each surface represents a phase duration of a coordinated phase in the entrance direction, which will play a fundamental role in plotting the entire three-dimensional time-space diagram.

In step S4, a green-wave bandwidth in an upbound direction of the coordinated route i is calculated, and positioning of a green-wave band in the upbound direction is completed, including specific steps as follows.

A green-wave bandwidth from a $1^{st}$ intersection to a $2^{nd}$ intersection, and a starting point and an ending point of the green-wave band are calculated to prepare for subsequent calculation of green-wave bandwidths of entire arterial roads from the $1^{st}$ intersection to a $3^{rd}$ intersection, from the $1^{st}$ intersection to a $4^{th}$ intersection, and from the $1^{st}$ intersection to an $n^{th}$ intersection.

In S401, a green-wave bandwidth from the $1^{st}$ intersection to a 2nd intersection $I_{(i,2)}$ in the upbound direction of the coordinated route i is calculated by the following formulas:

$$T^U_{S(i,2)} = \max\left\{T^U_{GS(i,1)} + \frac{L_{(i,1\to 2)}}{v_{(i,1\to 2)}}, T^U_{GS(i,2)}\right\}$$

$$T^U_{E(i,2)} = \min\left\{T^U_{GE(i,1)} + \frac{L_{(i,1\to 2)}}{v_{(i,1\to 2)}}, T^U_{GE(i,2)}\right\}$$

$$B_{(i,1\to 2)} = T^U_{E(i,2)} - T^U_{S(i,2)}$$

wherein: $T_{S(i,2)}{}^{U}$ and $T_{E(i,2)}{}^{U}$ respectively represent a starting point and an ending point of a green-wave band from the $1^{st}$ intersection $I_{(i,1)}$ to the $2^{nd}$ intersection $I_{(i,2)}$ in the upbound direction of the coordinated route i at a signal phase U of the intersection $I_{(i,2)}$; $T_{GS(i,1)}{}^{U}$ and $T_{GE(i,1)}{}^{U}$ represent a green starting point and a green ending point of a signal phase U of the intersection $I_{(i,1)}$; $T_{GS(i,2)}{}^{U}$ and $T_{GE(i,2)}{}^{U}$ represent a green starting point and a green ending point of the signal phase U of the intersection $I_{(i,2)}$; $L_{(i,1\to 2)}$ represents a distance from the intersection $I_{(i,1)}$ to the intersection $I_{(i,2)}$; $v_{(i,1\to 2)}$ represents a driving speed from the intersection $I_{(i,1)}$ to the intersection $I_{(i,2)}$; and $B_{(i,1\to 2)}$ represents the green-wave bandwidth from the $1^{st}$ intersection $I_{(i,1)}$ to the $2^{nd}$ intersection $I_{(i,2)}$ of the coordinated route i.

In S402, a green-wave bandwidth from the $1^{st}$ intersection $I_{(i,1)}$ to the $j^{th}$ intersection $I_{(i,j)}$ in the upbound direction of the coordinated route i is calculated by the following formulas:

$$T^U_{S(i,j)} = \max\left\{T^U_{S(i,j-1)} + \frac{L_{(i,j-1\to j)}}{v_{(i,j-1\to j)}}, T^U_{GS(i,j)}\right\}$$

$$T^U_{E(i,j)} = \min\left\{T^U_{E(i,j-1)} + \frac{L_{(i,j-1\to j)}}{v_{(i,j-1\to j)}}, T^U_{GE(i,j)}\right\}$$

$$B_{(i,1\to j)} = T^U_{E(i,j)} - T^U_{S(i,j)}$$

wherein: $T_{S(i,j)}^{U}$ and $T_{E(i,j)}^{U}$ respectively represent a starting point and an ending point of a green-wave band from the $1^{st}$ intersection $I_{(i,1)}$ to the $j^{th}$ intersection $I_{(i,j)}$ in the upbound direction of the coordinated route i at a signal phase U of the intersection $I_{(i,j)}$; $T_{GS(i,j)}^{U}$ and $T_{GE(i,j)}^{U}$ represent a green starting point and a green ending point of the signal phase U of the intersection $I_{(i,j)}$; $L_{(i,j-1 \to j)}$ represents a distance from an intersection $I_{(i,j-1)}$ to the intersection $I_{(i,j)}$; $v_{(i,j-1 \to j)}$ represents a driving speed from the intersection $I_{(i,j-1)}$ to the intersection $I_{(i,j)}$; and $B_{(i,1 \to j)}$ represents the green-wave bandwidth from the $1^{st}$ intersection $I_{(i,1)}$ to the $j^{th}$ intersection $I_{(i,j)}$ of the coordinated route i.

In S403, a green-wave bandwidth $B_{(i,1 \to n)} = T_{(i,n)}^{U} - T_{S(i,n)}^{U}$ from the $1^{st}$ intersection $I_{(i,1)}$ to a last intersection $I_{(i,n)}$ in the upbound direction of the coordinated route i is obtained, and positioning of the green-wave band in the upbound direction is completed according to a starting point $T_{S(i,n)}^{U}$ and an ending point $T_{E(i,n)}^{U}$ of the green-wave band at a signal phase U of the intersection $I_{(i,n)}$.

In step S5, a green-wave band in a downbound direction of the coordinated route i is calculated, and positioning of the green-wave band in the downbound direction is completed, including specific steps as follows.

In S501, a green-wave bandwidth from the $1^{st}$ intersection $I_{(i,n)}$ to a $2^{nd}$ intersection $I_{(i,n-1)}$ in the downbound direction of the coordinated route i is calculated by the following formulas:

$$T_{S(i,n-1)}^{D} = \max\left\{T_{GS(i,n)}^{D} + \frac{L_{(i,n \to n-1)}}{v_{(i,n \to n-1)}}, T_{GS(i,n-1)}^{D}\right\}$$

$$T_{E(i,n-1)}^{D} = \min\left\{T_{GE(i,n)}^{D} + \frac{L_{(i,n \to n-1)}}{v_{(i,n \to n-1)}}, T_{GE(i,n-1)}^{D}\right\}$$

$$B_{(i,n \to n-1)} = T_{E(i,n-1)}^{D} - T_{S(i,n-1)}^{D}$$

wherein: $T_{S(i,n-1)}^{D}$ and $T_{E(i,n-1)}^{D}$ respectively represent a starting point and an ending point of a green-wave band from the $1^{st}$ intersection $I_{(i,n)}$ to the $2^{nd}$ intersection $I_{(i,n-1)}$ in the downbound direction of the coordinated route i at a signal phase D of the intersection $I_{(i,n-1)}$; $T_{GS(i,n)}^{D}$ and $T_{GE(i,n)}^{D}$ represent a green starting point and a green ending point of a signal phase D of the intersection $I_{(i,n)}$; $T_{GS(i,n-1)}^{D}$ and $T_{GE(i,n-1)}^{D}$ represent a green starting point and a green ending point of the signal phase D of the intersection $I_{(i,n-1)}$; $L_{(i,n \to n-1)}$ represents a distance from the intersection $I_{(i,n)}$ to the intersection $I_{(i,n-1)}$; $v_{(i,n \to n-1)}$ represents a driving speed from the intersection $I_{(i,n)}$ to the intersection $I_{(i,n-1)}$; and $B_{(i,n \to n-1)}$ represents the green-wave bandwidth from the $1^{st}$ intersection $I_{(i,n)}$ to the $2^{nd}$ intersection $I_{(i,n-1)}$ of the coordinated route i.

In S502, the green-wave bandwidth from the intersection $I_{(i,n)}$ to the intersection $I_{(i,j)}$ in the downbound direction of the coordinated route i is calculated by the following formulas:

$$T_{S(i,j)}^{D} = \max\left\{T_{S(i,j+1)}^{D} + \frac{L_{(i,j+1 \to j)}}{v_{(i,j+1 \to j)}}, T_{GS(i,j)}^{D}\right\}$$

$$T_{E(i,j)}^{D} = \min\left\{T_{E(i,j+1)}^{D} + \frac{L_{(i,j+1 \to j)}}{v_{(i,j+1 \to j)}}, T_{GE(i,j)}^{D}\right\}$$

$$B_{(i,n \to j)} = T_{E(i,j)}^{D} - T_{S(i,j)}^{D}$$

wherein: $T_{S(i,j)}^{D}$ and $T_{E(i,j)}^{D}$ respectively represent a starting point and an ending point of a green-wave band from the intersection $I_{(i,n)}$ to the intersection $I_{(i,j)}$ in the downbound direction of the coordinated route i at a signal phase D of the intersection $I_{(i,j)}$; $T_{GS(i,j)}^{D}$ and $T_{GE(i,j)}^{D}$ represent a green starting point and a green ending point of the signal phase D of the intersection $I_{(i,j)}$; $L_{(i,j+1 \to j)}$ represents a distance from an intersection $I_{(i,j+1)}$ to the intersection $I_{(i,j)}$; $v_{(i,j+1 \to j)}$ represents a driving speed from the intersection $I_{(i,j+1)}$ to the intersection $I_{(i,j)}$; and $B_{(i,n \to j)}$ represents the green-wave bandwidth from the intersection $I_{(i,n)}$ to the intersection $I_{(i,j)}$ of the coordinated route i.

In S503, a green-wave bandwidth $B_{(i,n \to 1)} = T_{E(i,1)}^{D} - T_{S(i,1)}^{D}$ from the $1^{st}$ intersection $I_{(i,n)}$ to a last intersection $I_{(i,1)}$ in the downbound direction of the coordinated route i is obtained, and positioning of the green-wave band in the downbound direction is completed according to a starting point $T_{S(i,1)}^{D}$ and an ending point $T_{E(i,1)}^{D}$ of the green-wave band at a signal phase D of the intersection $I_{(i,1)}$.

A result of the green-wave bandwidth of each arterial road calculated according to the step S4 and the step S5 in the embodiment is shown in FIG. 8.

In step S6, a green-wave band starting point $T_{BS(i,j)}^{U}$ and a green-wave band ending point $T_{BE(i,j)}^{U}$ of the upbound green-wave band of the coordinated route i at an intersection $I_{(i,j)}$ are calculated by the following formulas, wherein $1 \leq j < n$; $T_{BS(i,n)}^{U} = T_{S(i,n)}^{U}$; and $T_{BE(i,n)}^{U} = T_{E(i,n)}^{U}$.

$$T_{BS(i,j)}^{U} = T_{S(i,n)}^{U} - \sum_{x=j+1}^{n} \frac{L_{(i,x-1 \to x)}}{v_{(i,x-1 \to x)}}$$

$$T_{BE(i,j)}^{U} = T_{E(i,n)}^{U} - \sum_{x=j+1}^{n} \frac{L_{(i,x-1 \to x)}}{v_{(i,x-1 \to x)}}$$

The starting point of the upbound green-wave band of each intersection is connected to obtain a starting trajectory of the upbound green-wave band of the coordinated route i, the ending point of the upbound green-wave band of each intersection is connected to obtain an ending trajectory of the upbound green-wave band of the coordinated route i, and the upbound green-wave band of the coordinated route i is obtained after determining the starting trajectory of the upbound green-wave band and the ending trajectory of the upbound green-wave band.

In step 7, a green-wave band starting point $T_{BS(i,j)}^{D}$ and a green-wave band ending point $T_{BE(i,j)}^{D}$ of the downbound green-wave band of the coordinated route i at the intersection $I_{(i,j)}$ are calculated by the following formulas, wherein $1 < j \leq n$; $T_{BS(i,1)}^{D} = T_{S(i,1)}^{D}$; $T_{BE(i,1)}^{D} = T_{E(i,1)}^{D}$.

$$T_{BS(i,j)}^{D} = T_{S(i,1)}^{D} - \sum_{x=2}^{j} \frac{L_{(i,x-1 \to x)}}{v_{(i,x-1 \to x)}}$$

$$T_{BE(i,j)}^{D} = T_{E(i,1)}^{D} - \sum_{x=2}^{j} \frac{L_{(i,x-1 \to x)}}{v_{(i,x-1 \to x)}}$$

The starting point of the downbound green-wave band of each intersection is connected to obtain a starting trajectory of the downbound green-wave band of the coordinated route i, the ending point of the downbound green-wave band of each intersection is connected to obtain an ending trajectory of the downbound green-wave band of the coordinated route i, the downbound green-wave band of the coordinated route i is obtained after determining the starting trajectory of the downbound green-wave band and the ending trajectory of the downbound green-wave band.

A three-dimensional coordinate of the green-wave band starting point in each entrance direction of each intersection is calculated according to the step S4 and the step S5, as shown in FIG. 9. A three-dimensional coordinate of the green-wave band ending point in each entrance direction of each intersection is calculated according to the step S4 and the step S5, as shown in FIG. 10.

Figure 11:
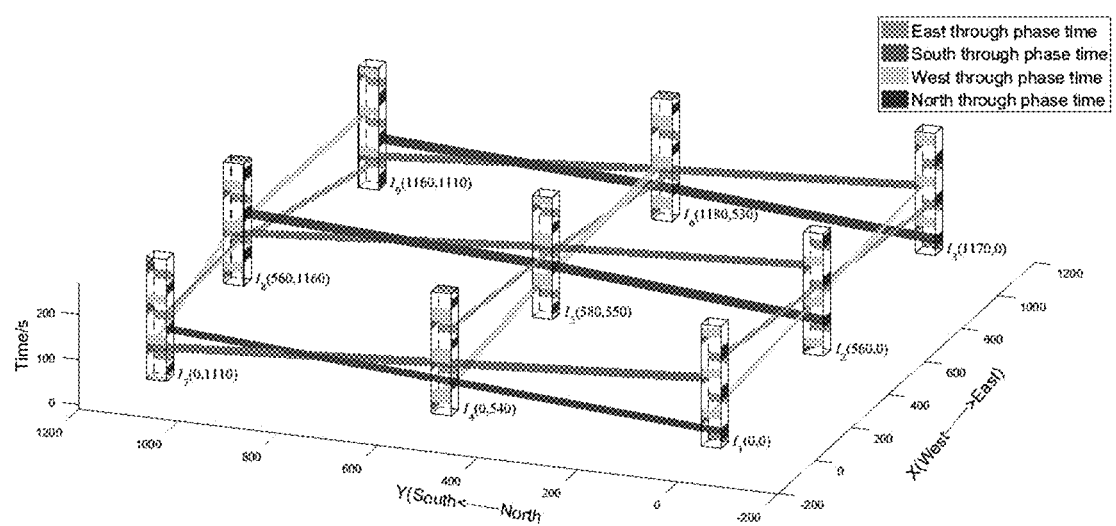
FIG. 11 is a time-space diagram showing a regional green-wave coordinated control effect according to the embodiment.

In the embodiment, the three-dimensional time-space diagram showing the regional green-wave coordinated control effect is finally obtained according to the above method steps, as shown in FIG. 11. The embodiment realizes three-dimensional description of a time-space relationship among the intersections in the road network, so that establishment of a road network coordinated control optimization model is facilitated.

Obviously, the above embodiments of the present invention are merely examples for clearly describing the present invention, but are not intended to limit the embodiments of the present invention. Any modifications, equivalents, and improvements made within the spirit and principle of the present invention shall fall within the protection scope of the claims of the present invention.

What is claimed is:

1. A plotting method for a three-dimensional time-space diagram showing a regional green-wave coordinated control effect, characterized in that, the plotting method comprises the following steps:

S1: selecting one of a plurality of intersections in an area as a benchmark intersection, establishing a coordinate system of the three-dimensional time-space diagram, and determining a position of the benchmark intersection in the coordinate system of the three-dimensional time-space diagram;

S2: determining a specific position coordinate of each of remaining intersections of the plurality of intersections in the coordinate system of the three-dimensional time-space diagram according to a position of each remaining intersection of the plurality of intersections other than the benchmark intersection relative to the benchmark intersection in the area;

S3: calculating a green starting point, a green center point and a green ending point of each signal phase of each intersection of the plurality of intersections based on a common signal cycle and green time, and generating a time prism of a signal timing plan of each intersection of the plurality of intersections in combination with a prism enclosed by cross sections of stop lines at each entrance of each intersection of the plurality of intersections;

S4: calculating a green-wave bandwidth from a $1^{st}$ intersection $I_{(i,1)}$ to each of the other n-1 intersections of a coordinated route i, wherein the $1^{st}$ intersection $I_{(i,1)}$ and the other n-1 intersections in the coordinated route i belong to the intersections in the area; and completing positioning of a green-wave band in an upbound direction of the coordinated route i; wherein i represents a serial number of a route to be coordinated where the $1^{st}$ intersection $I_{(i,1)}$ and the other n-1 intersections are located, n represents a total number of intersections on the coordinated route i, a $j^{th}$ intersection $I_{(i,j)}$ is one of the other n-1 intersections including a $2^{nd}$ intersection to a $n^{th}$ intersection, the green-wave bandwidth from the $1^{st}$ intersection $I_{(i,1)}$ to the $j^{th}$ intersection $I_{(i,j)}$ is obtained based on a time difference between a starting point $T_{S(i,j)}^{U}$ and an ending point $T_{E(i,j)}^{U}$ of the green-wave band from the $1^{st}$ intersection $I_{(i,1)}$ to the $j^{th}$ intersection $I_{(i,j)}$ in the upbound direction of the coordinated route i at a signal phase U of the $j^{th}$ intersection $I_{(i,j)}$;

S5: calculating a green-wave bandwidth from the $n^{th}$ intersection $I_{(i,n)}$ to each of the other n-1 intersections of the coordinated route i; and completing positioning of a green-wave band in a downbound direction of the coordinated route i; wherein the $j^{th}$ intersection $I_{(i,j)}$ is one of the other n-1 intersections including a $n-1^{th}$ intersection to the $1^{st}$ intersection, the green-wave bandwidth from the $n^{th}$ intersection $I_{(i,n)}$ to the $j^{th}$ intersection $I_{(i,j)}$ is obtained based on a time difference between a starting point $T_{S(i,j)}^{D}$ and an ending point $T_{E(i,j)}^{D}$ of the green-wave band from the $n^{th}$ intersection $I_{(i,n)}$ to the $j^{th}$ intersection $I_{(i,j)}$ in the downbound direction of the coordinated route i at a signal phase D of the $j^{th}$ intersection $I_{(i,j)}$;

S6: calculating a green-wave band starting point $T_{BS(i,j)}^{U}$ of an upbound green-wave band of the coordinated route i at the $j^{th}$ intersection $I_{(i,j)}$ based on the starting point of the green-wave band at the signal phase U of the $n^{th}$ intersection $I_{(i,n)}$ and sum of driving times from the $j^{th}$ intersection to the $n^{th}$ intersection, and calculating a green-wave band ending point $T_{BE(i,j)}^{U}$ of the upbound green-wave band of the coordinated route i at the $j^{th}$ intersection $I_{(i,j)}$ based on the ending point of the green-wave band at the signal phase U of the $n^{th}$ intersection $I_{(i,n)}$ and sum of driving times from the $j^{th}$ intersection to the $n^{th}$ intersection; and connecting the starting point of the upbound green-wave band of each intersection of the coordinated route i to obtain a starting trajectory of the upbound green-wave band of the coordinated route i, connecting the ending point of the upbound green-wave band of each intersection of the coordinated route i to obtain an ending trajectory of the upbound green-wave band of the coordinated route i, and obtaining the upbound green-wave band of the coordinated route i after determining the starting trajectory of the upbound green-wave band and the ending trajectory of the upbound green-wave band; and S7: calculating a green-wave band starting point $T_{BS(i,j)}^{D}$ of a downbound green-wave band of the coordinated route i at the $j^{th}$ intersection $I_{(i,j)}$ based on the starting point of the green-wave band at the signal phase D of the $1^{th}$ intersection $I_{(i,1)}$ and sum of driving times from the $j^{th}$ intersection to the $1^{st}$ intersection, and calculating a green-wave band ending point $T_{BE(i,j)}^{D}$ of the downbound green-wave band of the coordinated route i at the $j^{th}$ intersection $I_{(i,j)}$ based on the ending point of the green-wave band at the signal phase D of the $1^{st}$ intersection $I_{(i,1)}$ and sum of driving times from the $j^{th}$ intersection to the $1^{st}$ intersection; and connecting the starting point of the downbound green-wave band of each intersection of the coordinated route i to obtain a starting trajectory of the downbound green-wave band of the coordinated route i, connecting the ending point of the downbound green-wave band of each intersection of the coordinated route i to obtain an ending trajectory of the downbound green-wave band of the coordinated route i, obtaining the downbound green-wave band of the coordinated route i after determining the starting trajectory of the downbound green-wave band and the ending trajectory of the downbound green-wave band, and completing plotting.

2. The plotting method for the three-dimensional time-space diagram showing the regional green-wave coordinated control effect according to claim 1, characterized in that, in the step S1, the benchmark intersection is used as an origin, and a forward direction of an X-axis from west to east, a forward direction of a Y-axis from north to south, and a Z-axis of time are selected to establish the coordinate system of the three-dimensional time-space diagram.

3. The plotting method for the three-dimensional time-space diagram showing the regional green-wave coordinated control effect according to claim 1, characterized in that, the step S3 of calculating the green starting point, the green center point and the green ending point of each signal phase of each intersection of the coordinated route i is implemented by the following formulas:

$$T_{GS(i,j)}^k + \frac{1}{2} t_{G(i,j)}^k = T_{GM(i,j)}^k$$

$$T_{GM(i,j)}^k + \frac{1}{2} t_{G(i,j)}^k = T_{GE(i,j)}^k$$

wherein: j represents a serial number of each intersection of the plurality of intersections on each route to be coordinated, and defines a direction of the serial number of each intersection of the plurality of intersections from small to large as the upbound direction of the coordinated route, and a direction of the serial number of each intersections from large to small as the downbound direction of the coordinated route; $T_{GS(i,j)}^k$, $T_{GM(i,j)}^k$ and $T_{GE(i,j)}^k$ respectively represent a green starting point, a green center point and a green ending point of a signal phase k of the intersection $I_{(i,j)}$; and $t_{G(i,j)}^k$ represents a green time of the signal phase k of the intersection $I_{(i,j)}$.

4. The plotting method for the three-dimensional time-space diagram showing the regional green-wave coordinated control effect according to claim 3, characterized in that, the cross sections of the stop lines at each entrance of the intersection of the plurality of intersections are enclosed into the prism, and the cross sections of the stop lines at each entrance correspond to side surfaces of the time prism of the signal timing plan of the intersection of the plurality of intersections; and a corresponding green time of a coordinated phase is marked with a designated color block on each side surface of the time prism of the signal timing plan of the intersection of the plurality of intersections to form one time prism containing information of the signal timing plan of the intersection of the plurality of intersections.

5. The plotting method for the three-dimensional time-space diagram showing the regional green-wave coordinated control effect according to claim 1, characterized in that, the step S4 of calculating the green-wave bandwidth in the upbound direction of the coordinated route i and positioning the green-wave band comprises the following specific steps:

S401: calculating a green-wave bandwidth from the $1^{st}$ intersection to the $2^{nd}$ intersection $I_{(i,2)}$ in the upbound direction of the coordinated route i by the following formulas:

$$T_{S(i,2)}^U = \max\left\{T_{GS(i,1)}^U + \frac{L_{(i,1\to 2)}}{v_{(i,1\to 2)}}, T_{GS(i,2)}^U\right\}$$

$$T_{E(i,2)}^U = \min\left\{T_{GE(i,1)}^U + \frac{L_{(i,1\to 2)}}{v_{(i,1\to 2)}}, T_{GE(i,2)}^U\right\}$$

$$B_{(i,1\to 2)} = T_{E(i,2)}^U - T_{S(i,2)}^U$$

wherein: $T_{S(i,2)}^U$ and $T_{E(i,2)}^U$ respectively represent a starting point and an ending point of a green-wave band from the $1^{st}$ intersection $I_{(i,1)}$ to the $2^{nd}$ intersection $I_{(i,2)}$ in the upbound direction of the coordinated route i at the signal phase U of the intersection $I_{(i,2)}$; $T_{GS(i,1)}^U$ and $T_{GE(i,1)}^U$ represent a green starting point and a green ending point of the signal phase U of the intersection $I_{(i,1)}$; $T_{GS(i,2)}^U$ and $T_{GE(i,2)}^U$ represent a green starting point and a green ending point of the signal phase U of the intersection $I_{(i,2)}$; $L_{(i,1\to 2)}$ represents a distance from the intersection $I_{(i,1)}$ to the intersection $I_{(i,2)}$; $v_{(i,1\to 2)}$ represents a driving speed from the intersection $I_{(i,1)}$ to the intersection $I_{(i,2)}$; and $B_{(i,1\to 2)}$ represents the green-wave bandwidth from the $1^{st}$ intersection $I_{(i,1)}$ to the $2^{nd}$ intersection $I_{(i,2)}$ of the coordinated route i; and S402: calculating a green-wave bandwidth from the $1^{st}$ intersection $I_{(i,j)}$ to the $j^{th}$ intersection $I_{(i,j)}$ in the upbound direction of the coordinated route i by the following formulas:

$$T_{S(i,j)}^U = \max\left\{T_{S(i,j-1)}^U + \frac{L_{(i,j-1\to j)}}{v_{(i,j-1\to j)}}, T_{GS(i,j)}^U\right\}$$

$$T_{E(i,j)}^U = \min\left\{T_{E(i,j-1)}^U + \frac{L_{(i,j-1\to j)}}{v_{(i,j-1\to j)}}, T_{GE(i,j)}^U\right\}$$

$$B_{(i,1\to j)} = T_{E(i,j)}^U - T_{S(i,j)}^U$$

wherein: $T_{S(i,j)}^U$ and $T_{E(i,j)}^U$ respectively represent a starting point and an ending point of a green-wave band from the $1^{st}$ intersection $I_{(i,1)}$ to the $j^{th}$ intersection $I_{(i,j)}$ in the upbound direction of the coordinated route i at a signal phase U of the intersection $I_{(i,j)}$; $T_{GS(i,j)}^U$ and $T_{GE(i,j)}^U$ represent a green starting point and a green ending point of the signal phase U of the intersection $I_{(i,j)}$; $L_{(i,j-1\to j)}$ represents a distance from an intersection $I_{(i,j-1)}$ to the intersection $I_{(i,j)}$; $v_{(i,j-1\to j)}$ represents a driving speed from the intersection $I_{(i,j-1)}$ to the intersection $I_{(i,j)}$; and $B_{(i,1\to j)}$ represents the green-wave bandwidth from the $1^{st}$ intersection $I_{(i,1)}$ to the $j^{th}$ intersection $I_{(i,j)}$ of the coordinated route i; and S403: obtaining a green-wave bandwidth $B_{(i,1\to n)} = T_{E(i,n)}^U - T_{S(i,n)}^U$ from the $1^{st}$ intersection $I_{(i,1)}$ to a last intersection $I_{(i,n)}$ in the upbound direction of the coordinated route i, and completing positioning of the green-wave band in the upbound direction according to a starting point $T_{S(i,n)}^U$ and an ending point $T_{E(i,n)}^U$ of the green-wave band at the signal phase U of the intersection $I_{(i,n)}$.

6. The plotting method for the three-dimensional time-space diagram showing the regional green-wave coordinated control effect according to claim 5, characterized in that, the step S6 of calculating the green-wave band starting point $T_{BS(i,j)}^U$ and the green-wave band ending point $T_{BE(i,j)}^U$ of the inbound upbound green-wave band of the coordinated route i at the intersection $I_{(i,j)}$ is implemented by the following formulas:

$$T^U_{BS(i,j)} = T^U_{S(i,n)} - \sum_{x=j+1}^{n} \frac{L_{(i,x-1\to x)}}{v_{(i,x-1\to x)}}$$

$$T^U_{BE(i,j)} = T^U_{E(i,n)} - \sum_{x=j+1}^{n} \frac{L_{(i,x-1\to x)}}{v_{(i,x-1\to x)}}$$

wherein: $1 \leq j < n$; $T_{BS(i,n)}{}^U = T_{S(i,n)}{}^U$; $T_{BE(i,n)}{}^U = T_{E(i,n)}{}^U$; and x represents a variable of the serial number of the intersection.

7. The plotting method for the three-dimensional time-space diagram showing the regional green-wave coordinated control effect according to claim 1, characterized in that, the step S5 of calculating the green-wave bandwidth in the downbound direction of the coordinated route i and positioning the green-wave band comprises the following specific steps:

S501: calculating a green-wave bandwidth from the $n^{th}$ intersection $I_{(i,n)}$ to the n-$1^{th}$ intersection $I_{(i,n-1)}$ in the downbound direction of the coordinated route i by the following formulas:

$$T^D_{S(i,n-1)} = \max\left\{T^D_{GS(i,n)} + \frac{L_{(i,n\to n-1)}}{v_{(i,n\to n-1)}}, T^D_{GS(i,n-1)}\right\}$$

$$T^D_{E(i,n-1)} = \min\left\{T^D_{GE(i,n)} + \frac{L_{(i,n\to n-1)}}{v_{(i,n\to n-1)}}, T^D_{GE(i,n-1)}\right\}$$

$$B_{(i,n\to n-1)} = T^D_{E(i,n-1)} - T^D_{S(i,n-1)}$$

wherein: $T_{S(i,n-1)}{}^D$ and $T_{E(i,n-1)}{}^D$ respectively represent a starting point and an ending point of a green-wave band from the $n^{th}$ intersection $I_{(i,n)}$ to the n-$1^{th}$ intersection $I_{(i,n-1)}$ in the downbound direction of the coordinated route i at the signal phase D of the intersection $I_{(i,n\to 1)}$; $T_{GS(i,n)}{}^D$ and $T_{GE(i,n)}{}^D$ represent a green starting point and a green ending point of the signal phase D of the intersection $I_{(i,n)}$; $T_{GS(i,n-1)}{}^D$ and $T_{GE(i,n-1)}{}^D$ represent a green starting point and a green ending point of the signal phase D of the intersection $I_{(i,n-1)}$; $L_{(i,n\to n-1)}$ represents a distance from the intersection $I_{(i,n)}$ to the intersection $I_{(i,n-1)}$; $v_{(i,n\to n-1)}$ represents a driving speed from the intersection $I_{(i,n)}$ to the intersection $I_{(i,n-1)}$; and $B_{(i,n\to n-1)}$ represents the green-wave bandwidth from the $n^{th}$ intersection $I_{(i,n)}$ to the n-$1^{th}$ intersection $I_{(i,n-1)}$ of the coordinated route i; and S502: calculating the green-wave bandwidth from the $n^{th}$ intersection $I_{(i,n)}$ to the $j^{th}$ intersection $I_{(i,j)}$ in the downbound direction of the coordinated route i by the following formulas:

$$T^D_{S(i,j)} = \max\left\{T^D_{S(i,j+1)} + \frac{L_{(i,j+1\to j)}}{v_{(i,j+1\to j)}}, T^D_{GS(i,j)}\right\}$$

$$T^D_{E(i,j)} = \min\left\{T^D_{E(i,j+1)} + \frac{L_{(i,j+1\to j)}}{v_{(i,j+1\to j)}}, T^D_{GE(i,j)}\right\}$$

$$B_{(i,n\to j)} = T^D_{E(i,j)} - T^D_{S(i,j)}$$

wherein: $T_{S(i,j)}{}^D$ and $T_{E(i,j)}{}^D$ respectively represent a starting point and an ending point of a green-wave band from the $n^{th}$ intersection $I_{(i,n)}$ to the $j^{th}$ intersection $I_{(i,j)}$ in the downbound direction of the coordinated route i at the signal phase D of the intersection $I_{(i,j)}$; $T_{GS(i,j)}{}^D$ and $T_{GE(i,j)}{}^D$ represent a green starting point and a green ending point of the signal phase D of the intersection $I_{(i,j)}$; $L_{(i,j+1\to j)}$ represents a distance from an intersection $I_{(i,j+1)}$ to the intersection $I_{(i,j)}$; $v_{(i,j+1\to j)}$ represents a driving speed from the intersection $I_{(i,j+1)}$ to the intersection $I_{(i,j)}$; and $B_{(i,n\to j)}$ represents the green-wave bandwidth from the intersection $I_{(i,n)}$ to the intersection $I_{(i,j)}$ of the coordinated route i; and S503: obtaining a green-wave bandwidth $B_{(i,n\to 1)} = T_{E(i,1)}{}^D - T_{S(i,1)}{}^D$ from the $n^{th}$ intersection $I_{(i,n)}$ $1^{st}$ intersection $I_{(i,1)}$ in the downbound direction of the coordinated route i, and completing positioning of the green-wave band in the downbound direction according to a starting point $T_{S(i,1)}{}^D$ and an ending point $T_{E(i,1)}{}^D$ of the green-wave band at the signal phase D of the intersection $I_{(i,1)}$.

8. The plotting method for the three-dimensional time-space diagram showing the regional green-wave coordinated control effect according to claim 7, characterized in that, the step S7 of calculating the green-wave band starting point $T_{BS(i,j)}{}^D$ and the green-wave band ending point $T_{BE(i,j)}{}^D$ of the downbound green-wave band of the coordinated route i at the intersection $I_{(i,j)}$ is implemented by the following formulas:

$$T^D_{BS(i,j)} = T^D_{S(i,1)} - \sum_{x=2}^{j} \frac{L_{(i,x-1\to x)}}{v_{(i,x-1\to x)}}$$

$$T^D_{BE(i,j)} = T^D_{E(i,1)} - \sum_{x=2}^{j} \frac{L_{(i,x-1\to x)}}{v_{(i,x-1\to x)}}$$

wherein: $1 < j \leq n$; $T_{BS(i,1)}{}^D = T_{S(i,1)}{}^D$; $T_{BE(i,1)}{}^D = T_{E(i,1)}{}^D$, and x represents a variable of the serial number of the intersection of the plurality of intersections.

* * * * *